Figure 6:
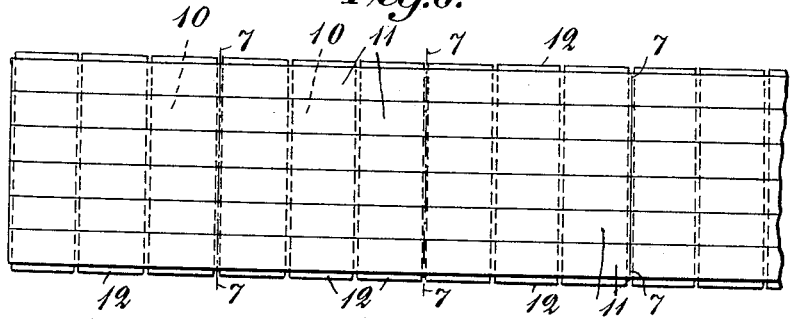

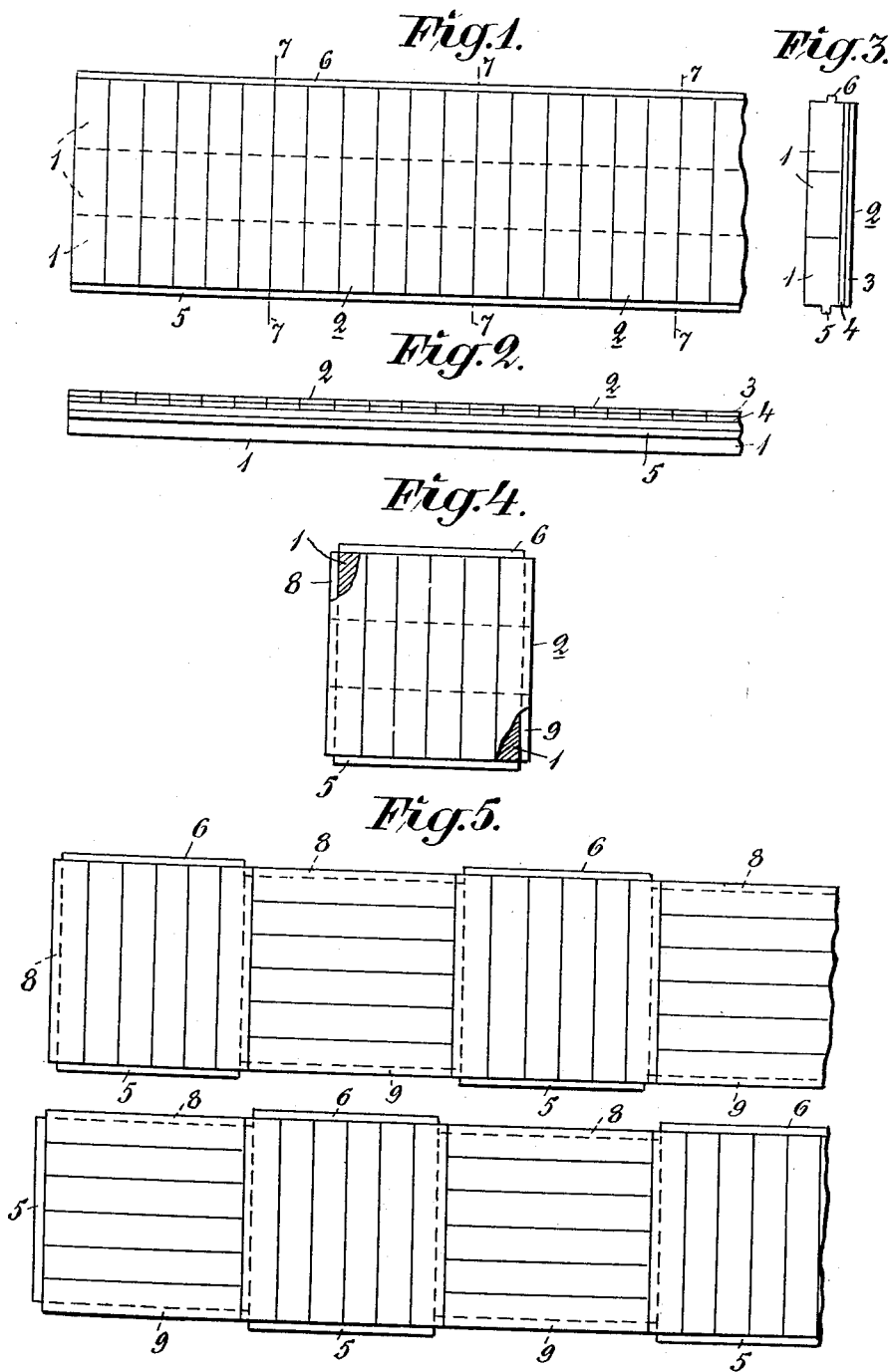

United States Patent Office 2,725,910
Patented Dec. 6, 1955

2,725,910

METHOD OF PRODUCING LAMINATED BOARDS OR SLABS WITH A PARQUET-PATTERNED WEARING SURFACE

Gustaf Kähr, Stockholm, Sweden

Application November 15, 1951, Serial No. 256,415

Claims priority, application Sweden September 22, 1948

6 Claims. (Cl. 144—309)

The present invention refers to a method of producing laminated match-boards or -slabs having a parquet-patterned wearing surface. As is well known, such boards or slabs consist of two or more layers of slabs or plywood glued together. In accordance with previous procedure the parquet pattern is generally obtained during the manufacture of the board or the slab by arranging the various parts of the wearing layer in a pattern, for instance, according to the usual checkered pattern embodied in parquet floors.

The present invention has for its object to simplify and to cheapen the manufacture of such boards or slabs, and the invention is principally distinguished by the feature that laminated boards are first produced with a wearing layer, in which the direction of the grain is the same throughout the length of the board, these boards being then provided with rigid tongues extending along both sides of the board, whereupon the boards thus produced are divided by means of transverse cuts into a number of uniform, preferably square slabs or units provided with grooves corresponding to the aforesaid tongues in the cut edges of the units, whereupon said units are combined into boards or larger slabs in which the individual units are so arranged relatively to each other as to form, in combination, a parquet pattern. It has been found to be practically feasible to produce laminated parquet boards from the originally laminated boards in said manner by uniting the severed units in rows by means of the tongues and grooves provided in the units, so as to make them form an integral board with tongues and grooves running alternately in the longitudinal and in the transverse direction of the board, respectively. Larger slab units may also be produced in this manner, such units then consisting of a plurality of rows of slab units arranged with the tongues and the grooves extending alternately in different directions. In both cases, the production is preferably undertaken on a factory-scale, so that the boards or slabs can be delivered in a finished condition to the place of work, where they are then united into floorings in a manner known per se. However, the manufacture of the flooring may also be effected so that the slab units obtained by the cutting of the original laminated boards are interconnected at the place of use, where they are laid directly onto the substructure of the flooring in such mutual positions as to form parquet patterns. An important distinguishing feature of the invention resides in that the original laminated boards are provided with longitudinally extending rigid tongues on both sides thereof, and that the severed slab units are provided with grooves in the cut edges. Here, the individual units will be provided with tongues along two opposed edges and with grooves along the two other edges. This will highly simplify the manufacture of the tongues and grooves necessary for the combination of the laminated parquet boards and slabs, besides which the combination of the units into the new boards or larger slabs is simplified and facilitated.

Figure 7:
Figure 8:
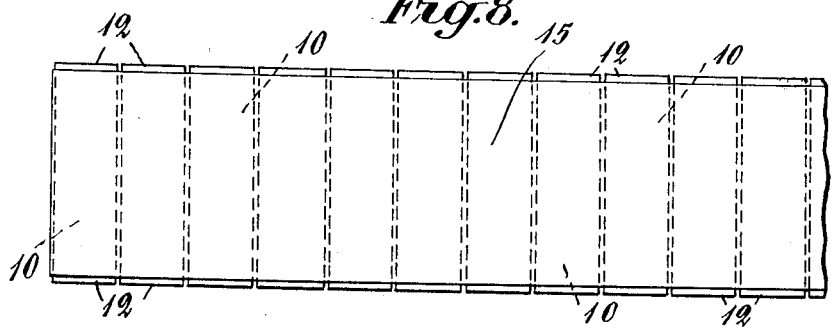
Figure 9:
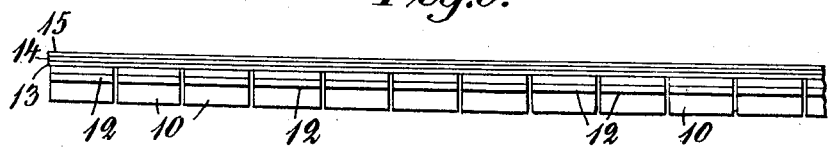

The invention is illustrated in the accompanying drawings. Figs. 1, 2 and 3 show various projections of a form of embodiment of the laminated board out of which the parquet-patterned boards or slabs are produced. Fig. 4 shows a slab unit severed from said board, in which unit the wearing layer is shown as partly cut away at two corners to illustrate the groove in the corresponding lateral edges. Fig. 5 shows two parquet-patterned laminated boards combined from units obtained by the cutting of a laminated board according to Figs. 1-3. Figs. 6 and 7 show two different projections of a further embodiment of the original board. Figs. 8 and 9 are views similar to Figs. 6 and 7 illustrating a third embodiment of the originally produced laminated board.

As shown in Figs. 1-3, the original laminated board consists of a sublayer 1 of longitudinally extending slab lengths and of a wearing layer of slab lengths 2, which are each combined from two plywood layers 3, 4 glued together. The slab lengths 2 are arranged in the transverse direction of the board so as to form a right angle with the longitudinal direction of the board, the uppermost plywood layer 3 of the various slab lengths being preferably arranged with the grain extending in the longitudinal direction of the slab lengths 2 and at right angles to the longitudinal direction of the board. The two plywood layers 3, 4 of every individual slab length are preferably arranged with the grain extending in the same direction. The production of said board preferably takes place in steps or continuously, in a manner such that the board is successively lengthened by joining and gluing the two layers of slab lengths together at one end of the board.

After a suitable length of such a board has been produced the board is provided with tongues 5, 6 along both edges thereof, said tongues being milled out of the bedding or sublayer slabs 1 located adjacent to the edges of the board. After that, the board is cut transversely, as shown, on lines 7—7 in Fig. 1, so that square boards or units of the same size are obtained. These units are then grooved by milling out grooves 8 and 9 in both cut edges of the square units or sections. Fig. 4 shows a unit produced in this manner. In the milling of the grooves, the opposite ends of the tongues 5, 6 extending along the other and opposite edges of each unit are removed at the same time, so that the tongues will have a length equal to the distance between the bases of the opposite grooves 8, 9.

From the slab elements or units thus produced, parquet-patterned boards can be produced in the manner shown in Fig. 5. The units are arranged in rows in such manner that the lengths and the grain of the wearing surface of adjacent units will run in directions at right angles to each other. Each unit with longitudinally extending directions of the slab lengths and the grain, respectively, will then engage the unit located on both sides thereof by means of their tongues 5, 6, which will thus fill the grooves in the edges of the adjacent units. The tongues of each slab unit having the slab lengths and the grain extending in a transverse direction will then form longitudinally extending tongues in the board, while the edge portions of the intermediate units have no longitudinally extending tongues. In uniting a plurality of such formed boards, the latter are fitted together as shown in Fig. 5, so that the tongues 5, 6 along the edge of one board will engage the grooves 8, 9 along the adjacent edge of the other board. A strong bond will thus be obtained between adjacent boards. The production of the individual boards in Fig. 5 preferably takes place on a factory-scale, while the uniting of the boards is effected at the place of use where the floor is to be laid. It is obviously possible to produce boards or slabs in the factory that consist of a plurality of rows of united slab units of the kind shown in Fig. 4. However, the units obtained by cutting the board according to Figs. 1-3, Fig. 4, may also be united at the place of use so as to form a flooring having a parquet-patterned wearing surface.

In the embodiment shown in Figs. 6 and 7, the original board consists of a wearing layer of longitudinally extending slab lengths 11 and a bedding or sublayer of transversely extending slab lengths 10, the opposite ends of which project outside the longitudinally extending edges of the wearing layer. Upon uniting and gluing of the board, the projecting ends of the slab lengths 10 are subjected to a milling operation, whereby the thickness of the end portions of the slab lengths is reduced to pins 12 forming the longitudinally extending tongues. This construction involves the advantage that the tongues become more resistant to strains of flexure and shearing stresses, inasmuch as the grain of the tongues extends at right angles to the longitudinally extending edges of the board. The slab lengths 11 of the wearing layer may be of an arbitrary length. They may have a length, for example, which is equal to the combined length of three slab units obtained by cutting the board on the section lines 7—7. These units are provided, in the manner previously described, with grooves in the edges of the slab lengths 10 located adjacent to the cut edges.

In the embodiment shown in Figs. 8 and 9, the bedding consists, as in Figs. 6 and 7, of transversely extending slab lengths 10, whereas the wearing layer consists of a number, three in the example shown, of plywood layers 13, 14, 15 glued together, the grain of which preferably extends in the longitudinal direction of the board. If desired, the intermediate plywood layer 14 may have a transversely extending grain. Said plywood layers cover the board for the whole of its length. The combined thickness of the plywood layers 13, 14, 15 may amount to 4–6 millimeters. The individual slabs are produced in the manner previously described by the cutting of the board along the lines 7—7, and are provided with grooves milled into the cut edges. In a flooring produced by slab units obtained from such a board and joined in the manner set forth hereinabove, the effect of a parquet-pattern will be obtained by the optical effect of the reflection of the light coming in onto the surface of the floor against the various surfaces of the slab, inasmuch as adjacent slab units will show different tones of light for different grain directions.

It is not necessary that the slab lengths 2 in Figs. 1–3 form a right angle to the longitudinal direction of the board, it being possible, for instance, to arrange them so that all of them extend in an oblique direction, for instance at an angle of 45° to the edges. In boards according to Figs. 8 and 9, the grain may also extend diagonally. In combining the units obtained from such a board in the manner described above, the slab lengths and the grain will extend diagonally in the individual units and at right angles to each other in adjacent units. In the embodiment according to Figs. 8 and 9, the slab lengths 11 of the bedding may extend obliquely to the edges of the board, if desired.

It is therefore clear that the present invention provides a method of producing laminated slabs, particularly parquet slabs, which comprises arranging and adhesively uniting in super-imposition to form a laminated board, a sublayer consisting of a plurality of lengths disposed in parallelism with the run of grain of each length extending in the same direction and a wearing layer of wood having its run of grain extending in the same direction throughout the extent of the wearing layer. The wearing layer extends coextensive in length with the length of the sublayer. Then rigid tongues are formed along opposite longitudinal marginal edges of the laminated board thus formed, the board is severed transversely of its length to form a plurality of uniformly square slabs or slab units and grooves are formed in the opposite edges of each thus formed slab, that is, those edges which are respectively each adjacent an edge having a tongue thereon so that the slab has tongues at two opposed edges and grooves at the other two edges. The method further comprehends the formation of the originally produced laminated board by arranging an adhesively united plurality of lengths in parallelism with the run of grain extending longitudinally of the board and super-imposing and adhesively uniting to the upper surfaces of the first lengths a plurality of narrower lengths arranged in parallelism and extending transversely of the axes of the first mentioned lengths. Further in the forming of the grooves the opposite end portions of the tongues on opposed edges of each unit are removed so that the extent of the tongues coincides with the distance between the bases of the opposite grooves. The method additionally comprehends the assembly of a plurality of the thus formed units together by arranging alternate units at right angles to one another with the slab lengths of the upper surface of the adjacent units extending respectively at right angles to one another and with the tongues of every other unit protruding from the respective units in a longitudinal direction of the assembled units and the grooves of alternate units extending in the longitudinal direction of the assembled units. Further, in order to make the thus produced structure of greater width, the invention comprehends assembling at least one other group of units in the said angularly displaced relationship and connecting the two thus assembled groups of units together by moving one group of units transversely of the longitudinal axis of the other group of units so that the opposed tongues of each unit of one group engage in the grooves of the transversely adjacent unit of the other group and the tongues of said other group engage in the adjacent grooves in the units of the first mentioned group.

In a more specific contemplation of the subject matter, the invention comprises a method of producing laminated parquet slabs comprising the steps of arranging a plurality of slab lengths in parallelism to form a sublayer with the lengths having the run of grain extending transversely of the longitudinal axis of the sublayer. Then a wearing layer consisting of a plurality of lengths arranged in parallelism with the run of grain extending transversely to the run of grain of the sublayer is adhesively united in super-imposition along and to the sublayer. The dimensions of the wearing layer transversely of the longitudinal axis of the sublayer are less than the transverse extent of the sublayer whereby the opposite ends of the slab lengths of the sublayer protrude beyond the opposed longitudinal edges of the wearing layer whereupon rigid tongues are formed on the opposite protruding ends of each slab length of the sublayer. The board thus formed is severed transversely of its longitudinal axis and in parallelism with the longitudinal extent of the slab lengths of the sublayer and bottom lengths of the sublayer so as to form square units each embodying a plurality of slab lengths with the lengths of one layer arranged transversely to the lengths of the other and finally grooves are formed in the longitudinal outer side edge of the sublayer so as to provide a plurality of parquet units having rigid tongues extending along two opposed edges and grooves extending along the other two edges. The method further comprehends the formation of a wearing layer by adhesively uniting at least one ply-wood layer having its run of grain extending in the longitudinal direction of the board to a plurality of slab lengths arranged in parallelism and having their run of grain extending transversely to the longitudinal axis of the board. The ply-wood layer has less transverse dimension than the longitudinal extent of the slab lengths so that the ends of the lengths protrude beyond lengths of the longitudinal edges of the ply-wood layer. The rigid tongues are then formed on the opposite and protruding ends of each slab length of the sublayer.

What I claim is:

1. A method of producing laminated slabs particularly parquet slabs comprising arranging and adhesively uniting in superimposition to form a laminated board, a sublayer consisting of a plurality of lengths disposed in parallelism with the run of grain of each length extending in the same direction, and a wearing layer of wood having its run of grain extending in the same direction throughout the extent of the wearing layer and the wearing layer extending co-extensive in length with the length of the sublayer, forming rigid tongues along opposite longitudinal marginal edges of the laminated board thus formed, severing the board transversely of the length thereof to form a plurality of uniformly square slabs and forming grooves in the opposite edges of each slab and which edges are respectively each adjacent an edge having a tongue thereon so that the slab has tongues at two opposed edges and grooves at the other two edges.

2. A method as defined in and by claim 1 in which the laminated board is formed by arranging and adhesively uniting a plurality of lengths in parallelism with the run of grain extending longitudinally of the board, superimposing and adhesively uniting to the upper surfaces of the first lengths a plurality of narrower lengths arranged in parallelism and extending transversely of the axes of the first mentioned lengths, forming rigid tongues along the opposite longitudinal edges of the board thus produced, severing the board transversely of the axes of the first mentioned lengths to form square units each embodying plural layers with plural lengths in each layer with the lengths of one layer extending at right angles to the lengths of the other, and forming grooves in the opposite edges of the units that are respectively adjacent the edges having the tongues thereon.

3. A method as defined in and by claim 2 in which in the forming of the grooves the opposite end portions of the tongues on opposite edges of each unit are removed so that the extent of the tongues coincides with the distance between the bases of the opposite grooves, assembling the plurality of said units together by arranging alternate units at right angles to one another with the slab lengths of the upper surface of the adjacent units extending respectively at right angles to one another, and with the tongues of every other unit protruding from the respective units in the longitudinal direction of the assembled units and the grooves of alternate units extending in the longitudinal direction of the assembled units.

4. A method as defined in and by claim 3, assembling at least one other group of units in said angularly displaced relationship and connecting the two thus assembled groups of units together by moving one group of units transversely of the longitudinal axis of the other group of units with the protruding tongues of every unit of one group engaging the grooves of the transversely adjacent unit of the other group and the tongues of said other group engaging the adjacent grooves in the units of the first mentioned group.

5. A method of producing laminated parquet slabs comprising arranging a plurality of slab lengths in parallelism to form a sublayer and said lengths having the run of grain thereof extending transversely to the longitudinal axis of the sublayer, adhesively uniting in superimposition a wearing layer consisting of a plurality of lengths arranged in parallelism with the run of grain extending transversely to the run of grain of the sublayer, and the dimensions of the wearing layer transversely of the longitudinal axis of the sublayer being less than the transverse extent of the sublayer whereby the opposite ends of the slab lengths of the sublayer protrude beyond the opposite longitudinal edges of the wearing layer, forming rigid tongues on the opposite protruding ends of each slab lengths of the sublayer, severing the board transversely of the longitudinal axis thereof and in parallelism with the longitudinal extent of the slab lengths of the sublayer and between slab lengths of the sublayer to form square units each embodying a plurality of slab lengths with the slab lengths of one layer arranged transversely to the slabs of the other, and forming grooves in the longitudinal outer side edge of each marginal slab length of the sublayer to provide a plurality of parquet units having rigid tongues extending along two opposite edges and grooves extending along the other two edges.

6. A method of producing laminated parquet slabs comprising arranging a plurality of slab lengths in parallelism to form a sublayer and said lengths having the run of grain thereof extending transversely to the longitudinal axis of the sublayer, adhesively uniting in superimposition a wearing layer consisting of at least one plywood layer having its run of grain extending in the longitudinal direction of the laminated board thus produced, said plywood layer having transverse dimensions less than the longitudinal extent of the slab lengths so that the ends of the lengths protrude beyond the opposite longitudinal edges of the plywood layer, forming rigid tongues on the opposite protruding ends of each slab length of the sublayer, severing the board transversely of the longitudinal axis thereof and in parallelism with the longitudinal extent of the slab lengths of the sublayer and between slab lengths of the sublayer to form square units, and forming grooves in the longitudinal outer side ege of each marginal slab lengths of the sublayer to provide a plurality of parquet units having rigid tongues extending along two opposite edges and grooves extending along the other two edges.

References Cited in the file of this patent

UNITED STATES PATENTS

| | | |
|---|---|---|
| 1,054,070 | Woloshin | Feb. 25, 1913 |
| 1,477,813 | Daniels | Dec. 18, 1923 |
| 1,602,267 | Karwisch | Oct. 5, 1926 |
| 1,660,480 | Daniels | Feb. 28, 1928 |
| 1,840,974 | Rockwell | Jan. 12, 1932 |
| 1,846,658 | Rockwell | Feb. 23, 1932 |
| 1,976,969 | Soukup | Oct. 16, 1934 |
| 1,991,821 | Rhinevault | Feb. 19, 1935 |
| 2,291,651 | Robinson | Aug. 4, 1942 |

FOREIGN PATENTS

| | | |
|---|---|---|
| 706,274 | France | of 1931 |
| 63,871 | Denmark | of 1945 |